United States Patent
Taylor et al.

(10) Patent No.: US 7,636,305 B1
(45) Date of Patent: Dec. 22, 2009

(54) METHOD AND APPARATUS FOR MONITORING NETWORK TRAFFIC

(75) Inventors: George Macrae Taylor, Edinburgh (GB); Paul Atkins, Edinburgh (GB); Katriona Lightbody, Midlothian (GB); Mark Hannah, Glasgow (GB); Paul Aitken, West Linton (GB); Andrew Johnson, Scottish Borders (GB)

(73) Assignee: Cisco Technology, Inc., San Jose, CA (US)

( * ) Notice: Subject to any disclaimer, the term of this patent is extended or adjusted under 35 U.S.C. 154(b) by 514 days.

(21) Appl. No.: 11/156,072

(22) Filed: Jun. 17, 2005

(51) Int. Cl.
*H04L 12/26* (2006.01)
(52) U.S. Cl. ............................. 370/230; 709/227
(58) Field of Classification Search ............ 370/392, 370/507, 510, 509; 709/227, 228
See application file for complete search history.

(56) References Cited

U.S. PATENT DOCUMENTS

| | | | |
|---|---|---|---|
| 5,440,556 A * | 8/1995 | Edem et al. | 370/465 |
| 6,499,107 B1 | 12/2002 | Gleichauf et al. | |
| 6,724,721 B1 | 4/2004 | Cheriton | |
| 6,738,814 B1 | 5/2004 | Cox et al. | |
| 6,823,387 B1 * | 11/2004 | Srinivas | 709/227 |
| 2001/0055274 A1 | 12/2001 | Hegge et al. | |
| 2002/0032880 A1 | 3/2002 | Poletto et al. | |
| 2002/0080824 A1 * | 6/2002 | Wingrove | 370/509 |
| 2002/0103916 A1 | 8/2002 | Chen et al. | |
| 2002/0191539 A1 | 12/2002 | Rawlins et al. | |
| 2003/0088671 A1 | 5/2003 | Klinker et al. | |
| 2003/0120817 A1 | 6/2003 | Ott et al. | |
| 2003/0145232 A1 | 7/2003 | Gorelik et al. | |
| 2004/0208122 A1 | 10/2004 | McDysan | |
| 2005/0039104 A1 | 2/2005 | Shah et al. | |
| 2005/0050358 A1 | 3/2005 | Lin | |
| 2006/0072455 A1 * | 4/2006 | Cai et al. | 370/230 |
| 2006/0171311 A1 | 8/2006 | Naik et al. | |
| 2006/0203721 A1 | 9/2006 | Hsieh et al. | |

OTHER PUBLICATIONS

Information Sciences Institute, "Transmission Control Protocol, DARPA Internet Program, Protocol Specification", dated Sep. 1981, prepared for Defense Advanced Research Projects Agency, 180 pgs.

Y. Rekhter, et al., "A Border Gateway Protocol 4 (BGP-4)", Memo, Network Working Group Request for Comments: 1771, dated Mar. 1995, 58 pgs.

* cited by examiner

*Primary Examiner*—Albert T Chou
(74) *Attorney, Agent, or Firm*—Hickman Palermo Truong & Becker LLP

(57) ABSTRACT

A method of monitoring network traffic flows of network traffic elements between locations in a data communications network is disclosed. The method comprises the step of classifying, as a first flow, traffic elements from a first to a second network location sharing a flow characteristic. The method further comprises the steps of classifying, as a second flow, traffic elements from said second to said first network location sharing said flow characteristic correlating said first and second flows.

20 Claims, 7 Drawing Sheets

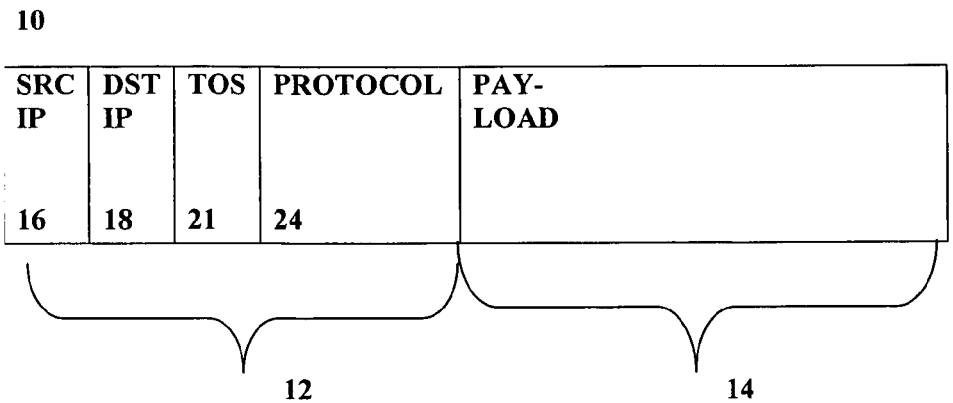

FIG. 1C
| SRC IP SA1 | DST IP DA1 | TOS X | PROTOCOL HTTP | FLOW COUNT 2 | SIZE 18 bytes |
|---|---|---|---|---|---|
| 16 | 18 | 21 | 24 | 25 | 27 |
| SRC IP SA1 | DST IP DA2 | TOS X | PROTOCOL HTTP | FLOW COUNT 2 | SIZE 22 bytes |
|---|---|---|---|---|---|
| 16 | 18 | 21 | 24 | 25 | 27 |

METHOD AND APPARATUS FOR MONITORING NETWORK TRAFFIC

FIELD OF THE INVENTION

The present invention generally relates to network traffic flows. The invention relates more specifically to a method and apparatus for monitoring network traffic flows.

BACKGROUND OF THE INVENTION

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

In computer networks such as the Internet, packets of data are sent from a source to a destination via a network of elements including links (communication paths such as telephone or optical lines) and nodes (for example, routers directing the packet along one or more of a plurality of links connected to it) according to one of various routing protocols. Elements in the network are typically identifiable by a unique internet protocol (IP) address.

One routing protocol used, for example, in the internet is Border Gateway Protocol (BGP). BGP is used to route data between autonomous systems (AS) comprising networks under a common administrator and sharing a common routing policy. BGP routers exchange full routing information during a connection session for example using Transmission Control Protocol (TCP) allowing inter-autonomous system routing. The information exchanged includes various attributes including a next-hop attribute. For example where a BGP router advertises a connection to a network, for example in a form of an IP address prefix, the next-hop attribute comprises the IP address used to reach the BGP router.

Within each AS the routing protocol typically comprises an interior gateway protocol (IGP) for example a link state protocol such as open shortest path first (OSPF) or intermediate system-intermediate system (IS-IS).

Where the network carries different types of traffic, for example email or video traffic, this may be handled by separate processes or ports on network components.

It is desirable in many instances to monitor the flow of network traffic for various purposes such as security and billing. The information derived can be used to identify, for example, "top talkers", that is, the noisiest protocol or most prolific addresses used. The information can be employed, for example, for network profiling, traffic analysis or for security purposes such as attack mitigation.

One way of monitoring the flow of network traffic is to categorize data packets forming the traffic as one of a plurality of "flows". According to this approach packets with common characteristics or key fields are grouped together as a flow. One example of such an approach is the NetFlow™ product which is a feature of Cisco IOS® software available from Cisco Systems, Inc, San Jose, Calif., USA. According to this approach, packets sharing a common set of key fields, defined as source and destination IP address, source and destination port, protocol, Type of Service (ToS) and input interface are classified as a single flow within a router through which the packets pass. By comparing such flows, information such as the flow having the largest number of packets or the largest number of bytes can be identified. In some instances not all packets are processed, but are randomly sampled, where a full view of all packets is not required.

However it would be desirable to derive yet further information from the flow profile created. For example the flows are categorized in too much detail to identify a particular source, destination or protocol which is consuming network bandwidth. In the case of attack mitigation in a Denial of Service (DoS) attack, an attacker sending many small flows from a multitude of spoofed source IP addresses may never show as a "top talker" because each separate flow only consists of a few packets and is short-lived.

According to existing flow monitoring schemes, flows are cached at the router allowing the relevant information to be derived from them. For example referring to FIGS. 1A, 1B and 1C which are schematic diagrams showing packets and classification of packets into flows to form a flow profile, a packet 10 is shown having a header 12 and a payload 14 (not shown to scale in terms of number of bits). The header 12 includes various fields including source IP address 16, destination IP address 18, ToS 21 and protocol 24.

Referring to FIGS. 1B and 1C, four packets 30, 32, 34, 36 are classified into two flows 38, 40. The first flow, 38 comprises two packets, 30, 34 with common source IP address SA1, destination IP address DA1, ToS "X" HTTP protocol, source and respective payloads of size 8 bytes and 10 bytes. As a result the size of the first flow 30 is recorded as two fields containing a count of the number of packets "FLOW COUNT" 25 and a count of the number of bytes "SIZE" 27, in this case: two packets and 18 bytes. A second flow 40 comprises packets 34, 36 having source IP address SA1, destination IP address DA2, ToS "X", HTTP protocol, respective payloads of size 15 bytes, 7 bytes. As a result the flow 40 is of size two packets and 22 bytes.

It will be seen that caching of flows requires significant storage requirements as a result of which the cached flows are periodically exported to a remote node termed a "collector" node. Export can take place upon various criteria being fulfilled. For example if a flow is continuing then cached entries for the flow can be exported upon expiry of a timer. If a flow is dormant for a predetermined period or terminated (for example the TCP connection is terminated), again the entries can be exported to a collector. At this time the exported flows can be aggregated according to one of various schemes in existing systems. For example flows can be grouped together with common source and destination AS and interface, the aggregation scheme further containing a record of the number of packets, number of flows, number of bytes and time stamp of first and last packets in the aggregation. Other schemes have been adopted including prefix aggregations, port or protocol aggregations or type of service (ToS) aggregations.

Although identification of flows and aggregated flows can be used to derive useful network information, the information collected does not allow analysis of certain complex message transactions for example involving multiple transactions between first and second network locations in both directions, such as connection sessions.

BRIEF DESCRIPTION OF THE DRAWINGS

The present invention is illustrated by way of example, and not by way of limitation, in the figures of the accompanying drawings and in which like reference numerals refer to similar elements and in which:

FIG. 1A is a schematic diagram showing a packet format;

FIG. 1B is a schematic diagram showing packets classified into a flow profile; FIG. 1C is a schematic diagram showing a flow profile for the packets of FIG. 1B;

DETAILED DESCRIPTION OF THE PREFERRED EMBODIMENT

A method and apparatus for monitoring network traffic flows is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Embodiments are described herein according to the following outline:

1.0 General Overview
2.0 Structural and Functional Overview
3.0 Method of Monitoring Network Traffic Flows
4.0 Implementation Mechanisms-Hardware Overview
5.0 Extensions and Alternatives

1.0 GENERAL OVERVIEW

The needs identified in the foregoing Background, and other needs and objects that will become apparent for the following description, are achieved in the present invention, which comprises, in one aspect, a method of monitoring network traffic flows of network traffic elements between locations in a data communications network. The method comprises the step of classifying as a first flow, traffic elements from a first to a second network location sharing a flow characteristic. The method further comprises the step of classifying as a second flow, traffic elements from said second to said first network location sharing said flow characteristic and correlating said first and second flows.

In other aspects, the invention encompasses a computer apparatus and a computer-readable medium configured to carry out the foregoing steps.

2.0 STRUCTURAL AND FUNCTIONAL OVERVIEW

Figure 2:
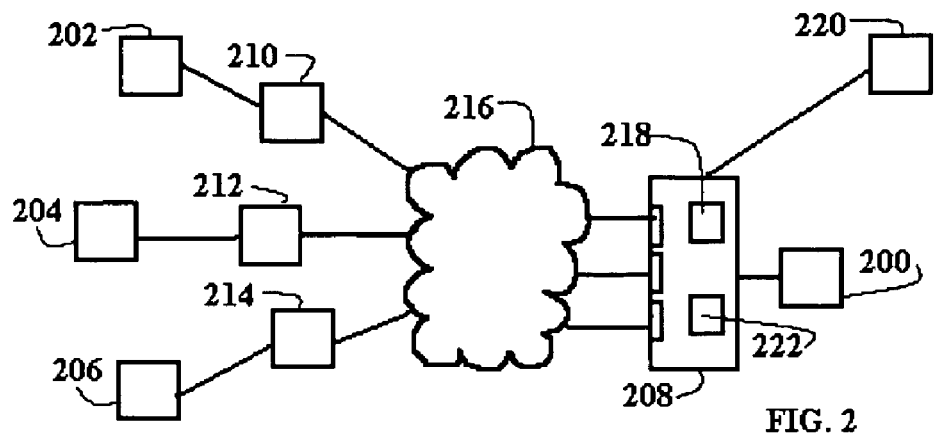
FIG. 2 is a representation of a network in which traffic flows are monitored.

In overview a method of monitoring network traffic flows can be understood with reference to FIG. 2 which depicts an illustrative network to which the method is applied. Traffic elements in the form of packets are sent between network locations on a data communications network for example network devices 200, 202, 204, 206 comprising host or client devices such as local network components having respective IP addresses. Each host 200, 202, 204, 206 is connected to a respective next-hop router 208, 210, 212, 214 which directs packets between the hosts via a network such as the Internet 216 typically via multiple ports. As is well known to the skilled reader, therefore, traffic for example from a client 202 with a destination address of host 200 is routed by the next-hop router 210 via the internet 216 according to any appropriate routing protocol, via next-hop router 208 to the destination host 200. Similarly packets from host 200 to client 202 are routed appropriately. Traffic can be classified into flows based on flow characteristics such as common source and destination IP address, AS address, protocol and so forth as described above. Classification typically takes place at the next-hop router to a participating network location. For example flows relating to the host 200 are classified at the next hop router 208 and for example stored in a cache 218. The flows can be exported to a collector component 220 as appropriate.

According to conventional approaches the flows are uni-directional, that is in one direction from a source to a destination. For example with reference to FIG. 2 packets from client 202 to host 200 sharing common flow characteristics may be identified as a common flow. However in some instances it is desirable to collect flow information on bi-directional flows, that is to say, traffic flowing to and fro between a source destination pair and sharing a flow characteristic.

Figure 3:
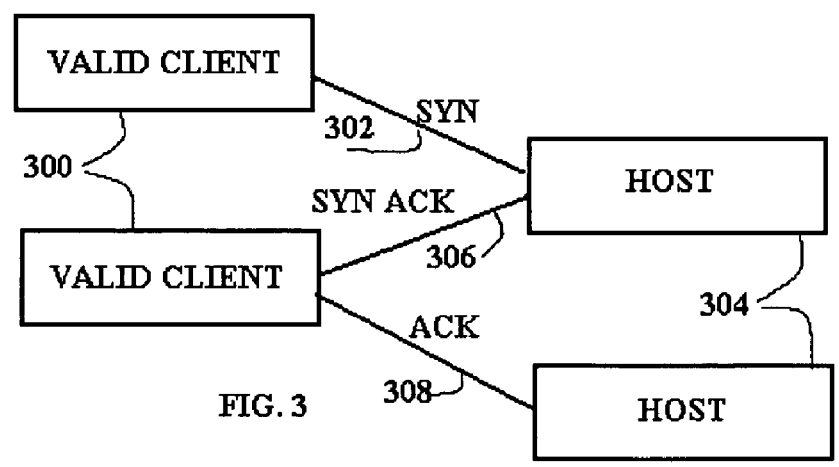
FIG. 3 is a schematic diagram showing a valid three-way connection session.

One instance in which such an approach would be beneficial is in the case of a "handshake sequence" for example a connection session between network locations such as the TCP SYN synchronized/start three-way handshake sequence. Referring to FIG. 3, which is a schematic diagram showing such a handshake session it will be seen that a valid client 300, upon initiation of a TCP session, sends a synchronization (SYN) message 302 to a host 304. The host returns an acknowledgement message (SYN ACK) 306 and the valid client 300 issues a further acknowledgement message (ACK) 308. For example, referring to FIG. 2, the three-way handshake may take place between network location 202 a valid client and network location 200 as host.

Figure 4:
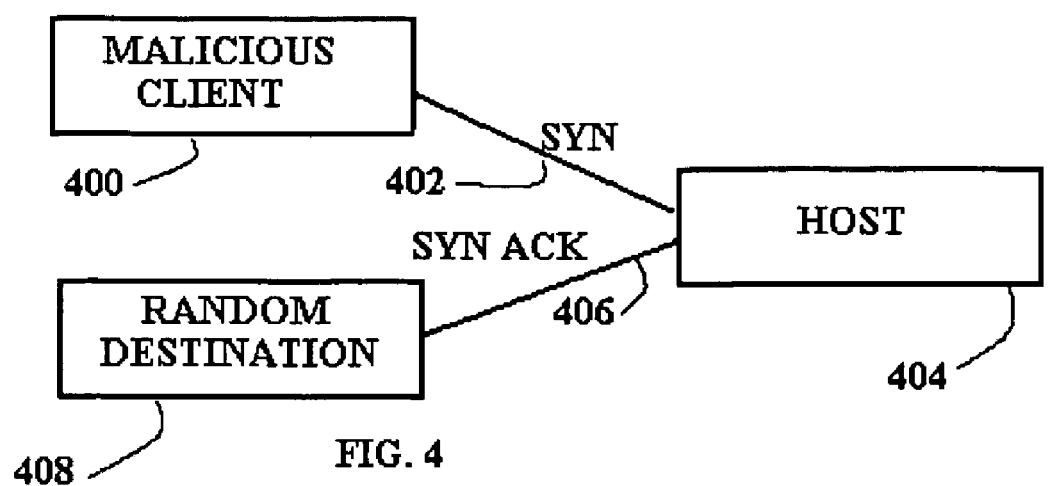
FIG. 4 is a schematic diagram showing a malicious connection session.

Monitoring of the session can be of importance for example in the case of network attacks. A common form of denial of service (DoS) attack on a network host is the misuse of the TCP SYN transaction according to which a malicious attacker sends a TCP SYN request to a victim host. The malicious SYN request uses a fake source address. The victim host stores the request in memory and replies to the source address of the requesting packet. As a result the SYN message is sent to a fake address and an ACK message is never triggered. The victim host is left waiting for an ACK indefinitely, wasting memory storing state. A malicious transaction of this type can be understood with reference to FIG. 4 which is a schematic diagram showing a malicious TCP SYN session according to which a malicious client 400 sends an SYN message 402 with a fake source address to a host address 404. The host sends an SYN ACK message 406 to a destination address corresponding to the source address of the SYN message and hence to a random destination 408. As the random destination 408 is not party to the connection session, it will not send an ACK message.

It will be seen that if multiple concurrent malicious SYN requests are sent with spoof source addresses then the victim host can consume significant memory resource very quickly as well as wasting CPU cycles.

Known solutions to such DoS SYN attacks include host based techniques according to which a time interval is set within which the ACK message must be received after which the memory is flushed. Other approaches involve the use of IP address filtering. For example for outgoing messages a router can block outgoing packets originating from a common AS but containing non-local source addresses as these may comprise malicious SYN attacks. At the incoming end a router can filter incoming packets having unknown source addresses, identifying them as potential SYN attacks to a next-hop network location. However it is desirable to provide yet further improved methods of detection, suppression and tracing of malicious traffic within a network.

According to the method described herein, a solution is to combine ingress and egress flows within a network device such as a next-hop router to a host to identify within the network malicious TCP SYN attacks. For example with reference to FIG. 2, where a first flow from a client 202 to a host 200 is classified as a flow showing a common flow characteristic (for example participation in a TCP SYN sequence) and stored in cache 218, a second flow is classified by virtue of the same flow characteristics for traffic passing in the opposite direction from host 200 to client 202. Then the first and second flows can be correlated allowing monitoring of the session and examination of the correlated flows for detection of the corresponding flow sequence—in this case the TCP SYN sequence. In the case that the session is not completed the required flow sequence is not detected indicating an extraordinary flow. In that case appropriate steps can be taken either to terminate the flow or investigate it further. For example detection, suppression and tracing of malicious traffic within the network can be facilitated.

Hence the flow accounting capabilities of a network device such as a router combine the ingress and egress flows into a single bi-directional flow state machine forming a traffic monitoring tool allowing early detection of host attacks. Furthermore bi-directional flow statistics will allow destinations that are receiving unacknowledged TCP SYN messages to be identified at an intermediary stage in the network. Normal TCP three-way handshakes will appear in a bi-directional flow state machines having two host bound packet messages and one client bound message whereas malicious attacks will appear in a bi-directional flow state machine as having one host bound packet message and one client bound message.

3.0 METHOD AND APPARATUS FOR MONITORING NETWORK TRAFFIC FLOWS

Figure 5:
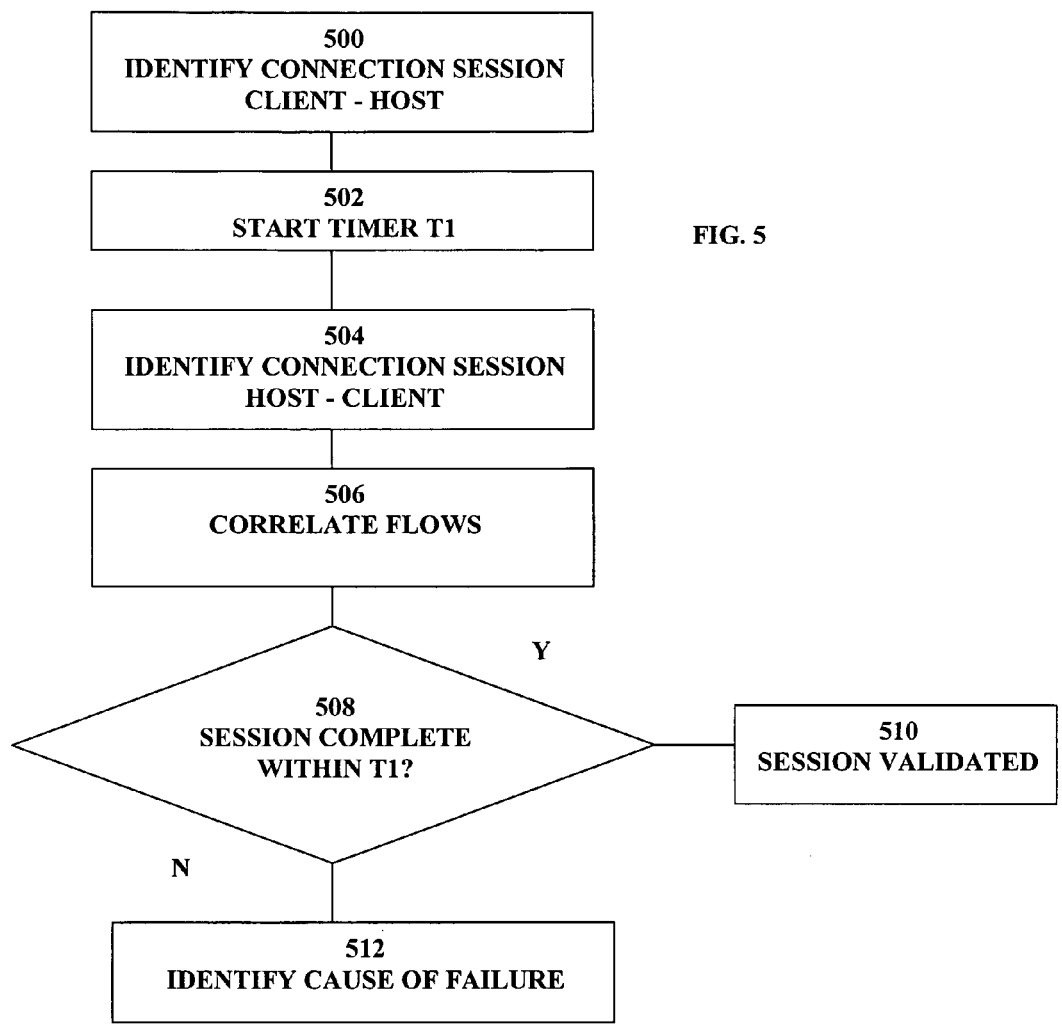
FIG. 5 is a flow diagram illustrating steps performed in monitoring traffic flow according to the method described herein.

The approach described herein can be further understood with reference to FIG. 5 which is a flow diagram illustrating aspects of the method. In block 500 the flow monitoring application examines packets to identify commencement of a TCP SYN session. In particular, in the context of FIG. 2, router 208 identifies header field elements of incoming packets for host 200 for a TCP flag.

In block 502 the router starts a timer defining a sequence interval T1 comprising a trigger timer. This can be defined to set a window within which the user would expect the handshake to complete and any appropriate interval, as well known to the skilled person, can be adopted. In block 504 the router identifies a corresponding flow from the host 200 to the originator of the session, client 202. In block 506 the router correlates the flows. As shown in FIG. 2, this may be in an additional cache 222 or in a common bi-directional cache allowing faster correlation of the flows.

In block 508 the router establishes whether the session has been completed within the interval T1. In particular the router identifies whether all three transactions within the handshake, namely the SYN message, the SYN ACK message and the ACK message have been detected within the bi-directional flow.

If the handshake has been completed then, in block 510, the flow is validated. In that case, for example, any filters in place can be updated to allow passage of all subsequent packets within the flow, or a flow showing appropriate common characteristics. In addition the records relating to the handshake session can be flushed, freeing up memory.

If the session did not complete within interval T1 then in block 512 the underlying cause of the failure is determined. For example, cached flow statistics can be reviewed to establish whether there has been numerous previous attempts from the same source address suggesting a potential spoof source address and hence a malicious attack. In that case appropriate suppression and tracing measures may be adopted as discussed below with reference to FIG. 6. If the statistics show that the attempt was potentially a genuine attempt then, if a repeat flow is detected then the steps described above with reference to FIG. 5 may be repeated.

Figure 6:
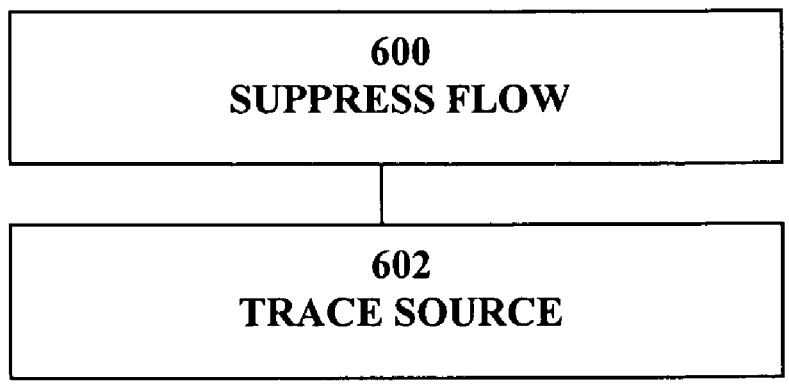
FIG. 6 is a flow diagram illustrating the steps performed in suppressing and tracing malicious flows.

Turning now to FIG. 6, in the event that a malicious session is detected then in block 600 the flow is suppressed. For example appropriate filters can be put in place to block the malicious flow based on TCP SYN attempts from the same source address. In block 602 appropriate tracing steps can be taken. For example the source interface of malicious traffic can be identified on the router. Even though the source IP address is spoofed, this can be used to paper trail the attack back to its true source in any appropriate manner as will be known to the skilled person. For example the MAC address in the flow can be used to trace back the originator of the attack.

It will be appreciated that the flows can be monitored at any appropriate network node or location. In an optimization flows are monitored at the next-hop router to a network device party to the session as this ensures that all traffic for the device passes through the monitoring location and speedy processing is obtained. However the monitoring location could be the network device itself. Similarly, correlation of the flows can be carried out at the monitoring location or remotely, for example at the collector 220. This latter approach reduces the processing burden at the monitoring location but potentially slows down detection of malicious attacks.

It will be seen that the approach can be applied to any bi-directional session and involving any number of transactions where an extraordinary flow sequence can be detected at the monitoring location.

It will be appreciated by the skilled reader that the steps described herein can be implemented in any appropriate manner, by incorporating appropriate code into an existing flow monitoring application such that detailed description is not required herein. Similarly correlation of the flows can be carried out in any appropriate manner as can detection of the flow sequences.

4.0 IMPLEMENTATION MECHANISMS

Hardware Overview

Figure 7:
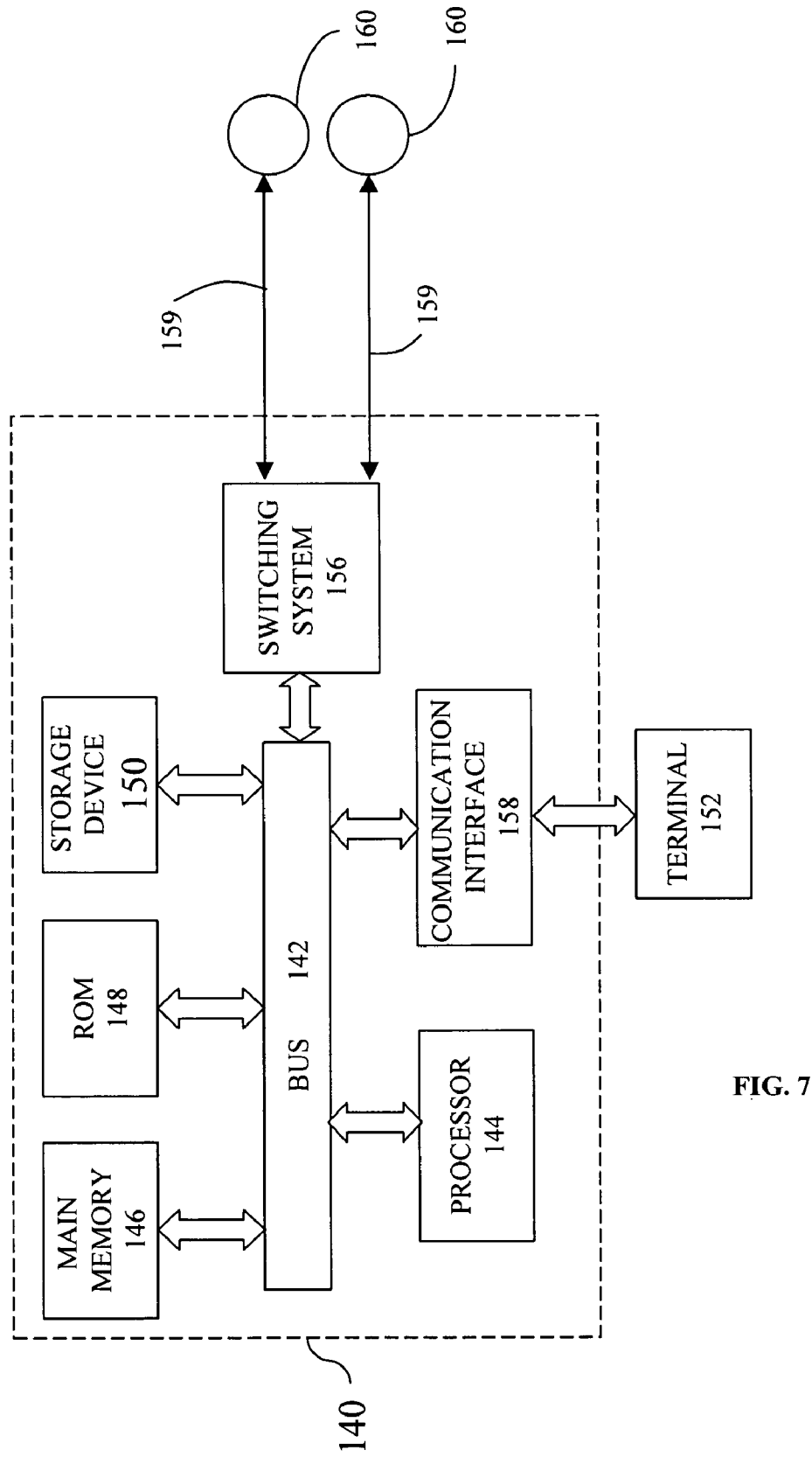
FIG. 7 is a block diagram that illustrates a computer system on which a method of monitoring traffic flows may be implemented.

FIG. 7 is a block diagram that illustrates a computer system 140 upon which the method may be implemented. The method is implemented using one or more computer programs running on a network element such as a router device. Thus, in this embodiment, the computer system 140 is a router.

Computer system 140 includes a bus 142 or other communication mechanism for communicating information, and a processor 144 coupled with bus 142 for processing information. Computer system 140 also includes a main memory 146, such as a random access memory (RAM), flash memory, or other dynamic storage device, coupled to bus 142 for storing information and instructions to be executed by processor 144. Main memory 146 may also be used for storing temporary variables or other intermediate information during execution of instructions to be executed by processor 144. Computer system 140 further includes a read only memory (ROM) 148 or other static storage device coupled to bus 142 for storing static information and instructions for processor 144. A storage device 150, such as a magnetic disk, flash memory or optical disk, is provided and coupled to bus 142 for storing information and instructions.

A communication interface 158 may be coupled to bus 142 for communicating information and command selections to processor 144. Interface 158 is a conventional serial interface such as an RS-232 or RS-422 interface. An external terminal 152 or other computer system connects to the computer system 140 and provides commands to it using the interface 158. Firmware or software running in the computer system 140 provides a terminal interface or character-based command interface so that external commands can be given to the computer system.

A switching system 156 is coupled to bus 142 and has an input interface and a respective output interface (commonly designated 159) to external network elements. The external network elements may include a plurality of additional routers 160 or a local network coupled to one or more hosts or routers, or a global network such as the Internet having one or more servers. The switching system 156 switches information traffic arriving on the input interface to output interface 159 according to pre-determined protocols and conventions that are well known. For example, switching system 156, in cooperation with processor 144, can determine a destination of a packet of data arriving on the input interface and send it to the correct destination using the output interface. The destinations may include a host, server, other end stations, or other routing and switching devices in a local network or Internet.

The computer system 140 implements as a network location acting as a monitoring location the above described method of monitoring network traffic flows. The implementation is provided by computer system 140 in response to processor 144 executing one or more sequences of one or more instructions contained in main memory 146. Such instructions may be read into main memory 146 from another computer-readable medium, such as storage device 150. Execution of the sequences of instructions contained in main memory 146 causes processor 144 to perform the process steps described herein. One or more processors in a multi-processing arrangement may also be employed to execute the sequences of instructions contained in main memory 146. In alternative embodiments, hard-wired circuitry may be used in place of or in combination with software instructions to implement the method. Thus, embodiments are not limited to any specific combination of hardware circuitry and software.

The term "computer-readable medium" as used herein refers to any medium that participates in providing instructions to processor 144 for execution. Such a medium may take many forms, including but not limited to, non-volatile media, volatile media, and transmission media. Non-volatile media includes, for example, optical or magnetic disks, such as storage device 150. Volatile media includes dynamic memory, such as main memory 146. Transmission media includes coaxial cables, copper wire and fiber optics, including the wires that comprise bus 142. Transmission media can also take the form of wireless links such as acoustic or electromagnetic waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, or any other medium from which a computer can read.

Various forms of computer readable media may be involved in carrying one or more sequences of one or more instructions to processor 144 for execution. For example, the instructions may initially be carried on a magnetic disk of a remote computer. The remote computer can load the instructions into its dynamic memory and send the instructions over a telephone line using a modem. A modem local to computer system 140 can receive the data on the telephone line and use an infrared transmitter to convert the data to an infrared signal. An infrared detector coupled to bus 142 can receive the data carried in the infrared signal and place the data on bus 142. Bus 142 carries the data to main memory 146, from which processor 144 retrieves and executes the instructions. The instructions received by main memory 146 may optionally be stored on storage device 150 either before or after execution by processor 144.

Interface 159 also provides a two-way data communication coupling to a network link that is connected to a local network. For example, the interface 159 may be an integrated services digital network (ISDN) card or a modem to provide a data communication connection to a corresponding type of telephone line. As another example, the interface 159 may be a local area network (LAN) card to provide a data communication connection to a compatible LAN. Wireless links may also be implemented. In any such implementation, the interface 159 sends and receives electrical, electromagnetic or optical signals that carry digital data streams representing various types of information.

The network link typically provides data communication through one or more networks to other data devices. For example, the network link may provide a connection through a local network to a host computer or to data equipment operated by an Internet Service Provider (ISP). The ISP in turn provides data communication services through the world wide packet data communication network now commonly referred to as the "Internet". The local network and the Internet both use electrical, electromagnetic or optical signals that carry digital data streams. The signals through the various networks and the signals on the network link and through the interface 159, which carry the digital data to and from computer system 140, are exemplary forms of carrier waves transporting the information.

Computer system 140 can send messages and receive data, including program code, through the network(s), network link and interface 159. In the Internet example, a server might transmit a requested code for an application program through the Internet, ISP, local network and communication interface 158. One such downloaded application provides for the method as described herein.

The received code may be executed by processor 144 as it is received, and/or stored in storage device 150, or other non-volatile storage for later execution. In this manner, computer system 140 may obtain application code in the form of a carrier wave.

EXTENSIONS AND ALTERNATIVES

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

The method can be applied in any appropriate network, in relation to any routing protocol and on any appropriate network device or component in relation to any data type or element, for example data packets. For example the method can be implemented on any device running a flow monitoring application such as NetFlow™.

What is claimed is:

1. A method of monitoring network traffic flows of network traffic elements between locations in a data communications network comprising the steps of:

classifying, as a first flow, traffic elements from a first to a second network location sharing a flow characteristic;

classifying, as a second flow, traffic elements from said second to said first network location sharing said flow characteristic;

a next-hop router correlating said first and second flows;

the next-hop router examining the correlated flows to detect a flow sequence, including detecting whether the flow sequence occurs within a specified time interval;

wherein the flow sequence indicates that the correlated first and second flows comprise a completed connection session between the first and the second network location;

in response to failing to detect the flow sequence, the next-hop router identifying at least one flow of the correlated flows as an extraordinary flow.

2. A method as claimed in claim 1 further comprising the steps of identifying a mitigation strategy and implementing the mitigation strategy.

3. A method as claimed in claim 2 in which the extraordinary flow comprises a network attack flow.

4. A method as claimed in claim 1 in which the first and second flows comprise a connection session.

5. A method as claimed in claim 4 in which the connection session comprises a TCP synchronize/start session.

6. A method as claimed in claim 5 in which traffic elements comprising an SYN message are classified as the first flow, traffic elements comprising an SYN ACK message are classified as the second flow and traffic elements comprising an ACK message are classified as a third flow and in which the first, second and third flows are correlated by the next-hop router.

7. A method as claimed in claim 6 in which if an ACK message is not detected within a sequence interval then the at least one flow of the correlated flows is identified as the extraordinary flow.

8. A method as claimed in claim 7 further comprising implementing a mitigation strategy upon detection of the extraordinary flow.

9. A method as claimed in claim 8 in which the mitigation strategy comprises at least one of identifying a source of the extraordinary flow and suppressing the extraordinary flow.

10. A method as claimed in claim 1 in which the classifying steps are carried out at a monitoring location comprising one of the first or second network locations or a next-hop location to the first and second network location.

11. A method as claimed in claim 1 in which the traffic elements comprise packets.

12. A method as claimed in claim 1 in which the flow characteristic comprises a traffic element header field attribute.

13. A computer-readable volatile or non-volatile storage medium storing one or more sequences of instructions which, when executed by one or more processors, cause the one or more processors to perform the steps of:

classifying, as a first flow, traffic elements from a first to a second network location sharing a flow characteristic;

classifying, as a second flow, traffic elements from said second to said first network location sharing said flow characteristic;

a next-hop router correlating said first and second flows;

the next-hop router examining the correlated flows to detect a flow sequence, including detecting whether the flow sequence occurs within a specified time interval;

wherein the flow sequence indicates that the correlated first and second flows comprise a completed connection session between the first and the second network location; and in response to failing to detect the flow sequence, the next-hop router identifying at least one flow of the correlated flows as an extraordinary flow.

14. A computer-readable medium as claimed in claim 13 in which the one or more sequences of instructions, when executed by one or more processors, cause the one or more processors to perform the additional steps of identifying a mitigation strategy and implementing the mitigation strategy.

15. A computer-readable medium as claimed in claim 13 in which the first and second flows comprise a connection session.

16. An apparatus, comprising:

one or more processors; and a network interface communicatively coupled to the one or more processors and configured to communicate one or more packet flows among the one or more processors in a network and a computer-readable volatile or non-volatile storage medium storing one or more sequences of instructions which, when executed by one or more processors, cause the one or more processors to perform the steps of:

classifying, as a first flow, traffic elements from a first to a second network location sharing a flow characteristic;

classifying, as a second flow, traffic elements from said second to said first network location sharing said flow characteristic;

correlating said first and second flows;

examining the correlated flows to detect a flow sequence, including detecting whether the flow sequence occurs within a specified time interval;

wherein the flow sequence indicates that the correlated first and second flows comprise a completed connection session between the first and the second network location; and in response to failing to detect the flow sequence, the next-hop router identifying at least one flow of the correlated flows as an extraordinary flow.

17. An apparatus as claimed in claim 16 in which the one or more sequences of instructions, when executed by one or more processors, cause the one or more processors to perform the additional steps of identifying a mitigation strategy and implementing the mitigation strategy.

18. An apparatus as claimed in claim 16 in which the first and second flows comprise a connection session.

19. An apparatus as claimed in claim 16 in which said classifying steps are performed at a next-hop router relative to said first network location.

20. An apparatus for monitoring network traffic flows from network traffic elements between locations in a data communications network comprising:

one or more processors;

means for classifying as a first flow, traffic elements from a first to a second network location sharing a flow characteristic;

means for classifying as a second flow traffic elements from said second to said first network location sharing said flow characteristic;

means for correlating said first and second flows;

means for examining the correlated flows to detect a flow sequence, including detecting whether the flow sequence occurs within a specified time interval;

wherein the flow sequence indicates that the correlated first and second flows comprise a completed connection session between the first and the second network location; and means responsive to not detecting the flow sequence for identifying, by the next-hop router, at least one flow of the correlated flows as an extraordinary flow.

* * * * *

UNITED STATES PATENT AND TRADEMARK OFFICE
CERTIFICATE OF CORRECTION

PATENT NO.       : 7,636,305 B1
APPLICATION NO. : 11/156072
DATED            : December 22, 2009
INVENTOR(S)      : Taylor et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 918 days.

Signed and Sealed this

Twenty-first Day of December, 2010

David J. Kappos
*Director of the United States Patent and Trademark Office*